United States Patent
Arimatsu et al.

[19]
[11] Patent Number: 6,128,020
[45] Date of Patent: *Oct. 3, 2000

[54] COMPUTER SYSTEM SUPPORTING DESIGN OPERATION OF THREE-DIMENSIONAL OBJECT AND METHOD THEREFOR

[75] Inventors: Masatomo Arimatsu, Kawasaki; Kazuaki Miura, Matsuyama, both of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/850,814

[22] Filed: May 2, 1997

Related U.S. Application Data

[63] Continuation of application No. 08/402,604, Mar. 13, 1995, abandoned.

[30] Foreign Application Priority Data

Jul. 1, 1994 [JP] Japan .................................. 6-150718

[51] Int. Cl.[7] .................................................. G06T 17/40
[52] U.S. Cl. ........................................... 345/420; 707/502
[58] Field of Search ..................... 345/418, 419, 345/420, 427; 707/502

[56] References Cited

U.S. PATENT DOCUMENTS

| | | | |
|---|---|---|---|
| 4,933,865 | 6/1990 | Yamamoto et al. | 382/203 |
| 5,010,502 | 4/1991 | Diebel et al. | 395/119 |
| 5,297,241 | 3/1994 | Hirr, Jr. et al. | 395/127 |
| 5,434,966 | 7/1995 | Nakazawa et al. | 395/161 |
| 5,537,641 | 7/1996 | Da Vitoria Lobo et al. | 395/119 |

FOREIGN PATENT DOCUMENTS 3-211674  9/1991  Japan .
5-342310  12/1993  Japan .

OTHER PUBLICATIONS

Wagstaff, Macintosh 3–D Workshop, p. 106–111, 117–122, 136–140, 1993.

*Primary Examiner*—Joseph H. Feild
*Attorney, Agent, or Firm*—Staas & Halsey LLP

[57] ABSTRACT

A two-dimensional data reference section refers to two-dimensional drawing data stored in a two-dimensional data storage section, and specifies two-dimensional drawing data including sketch fundamental plane shapes to be used for three-dimensional modelling on a sketch screen. A two-dimensional data take-in section specifies plane shapes to be used for sketch fundamental plane shapes from among the two-dimensional drawing data displayed in response to the specification by the two-dimensional data reference section, and takes such shapes into the sketch screen. The conversion section converts the two-dimensional data of the plane shapes taken in by the two-dimensional data take-in section into three-dimensional data, and prepares three-dimensional data for the sketch fundamental plane shapes.

14 Claims, 15 Drawing Sheets

FIG. 12A

| INDEX | x-COORDINATES VALUE | y-COORDINATES VALUE | RGB DATA | CONTROL PARAMETERS |
|---|---|---|---|---|
| 34 | 36 | 38 | 40 | 42 |

FIG. 12B

| INDEX | x-COORDINATES VALUE | y-COORDINATES VALUE | z-COORDINATES VALUE | RGB DATA | CONTROL PARAMETERS |
|---|---|---|---|---|---|
| 44 | 46 | 48 | 50 | 52 | 54 |

| INDEX | 2.0 | 3.0 | RGB DATA | CONTROL PARAMETERS |
|---|---|---|---|---|
| 34 | 36 | 38 | 40 | 42 |

F I G. 1 3 A

| INDEX | 2.0 | 3.0 | 0.0 | RGB DATA | CONTROL PARAMETERS |
|---|---|---|---|---|---|
| 44 | 46 | 48 | 50 | 52 | 54 |

F I G. 1 3 B

COMPUTER SYSTEM SUPPORTING DESIGN OPERATION OF THREE-DIMENSIONAL OBJECT AND METHOD THEREFOR

This application is a continuation of application Ser. No. 08/402,604, filed Mar. 13, 1995, now abandoned.

BACKGROUND OF THE INVENTION

1. Field of the Invention

The present invention relates to a computer aided design (CAD) system for design operations of a three-dimensional object with the support of a computer to conduct design, expression, manipulation, display and analysis of the three-dimensional object and a method for such support. More particularly, to a computer aided design system for preparing a sketch fundamental plane shape forming a basis for designing a three-dimensional object on a sketch display screen by the utilization of drawing data assets prepared by a two-dimensional CAD, and a method for such support.

2. Description of the Related Art

The purpose of a computer sided design system for carrying out design operations with the support of a computer has conventionally been to prepare two-dimensional drawing data among others. Today, a CAD system is conventionally for transferring to preparation of three-dimensional drawing data for conducting design, expression, manipulation, display and analysis of a three-dimensional object along with the recent innovative improvement of computer performance.

When carrying out design operations of a three-dimensional object on a computer aided design system, it has been the conventional practice to display a sketch screen serving as an operating screen on the display, and conduct three-dimensional modelling of the design object with the use of various support tools on the sketch screen. For three-dimensional modelling, there are available the following two methods. The first method consists of preparing a three-dimensional graphic on the sketch screen as if a sketch were made on a sheet of paper, and the operator repeatedly modifies the three-dimensional graphics on the sketch screen, if necessary repeats consideration. This method is applied when designing an object starting from the very initial step for a new development, for example. The second method is to prepare plane shapes such as end faces and cross-sectional faces of the object forming the basis for three-dimensional modelling while viewing existing drawings, and adding cubic details on the basis of this plane shape. This basic plane shape prepared by the second method is usually called the sketch fundamental plane shape (or sketch sectional shape), and the screen for preparing this basic shape is called the sketch definition screen. The technique of three-dimensional modelling based on such a sketch fundamental plane shape is utilized for changing the model, improvement and upgrading a version of an already designed object, and permits design operations by the effective utilization of the existing drawing data.

In the conventional preparing operation of the sketch fundamental plane shape, however, the operator enters the shape by using the drawing function of the three-dimensional computer aided design system while viewing the existing drawings printed out on sheets of paper. This has posed the problem of the necessity of much time and labor for this input operation when the plane shape is complicated.

There is available a system in which, simultaneously with a window for sketching, two-dimensional drawing data are displayed in another window, and a basic shape is entered into the window for sketching while referring to this window screen. This is, however, similar to the above-mentioned operation in that the operator enters the shape by the use of the drawing function of a three-dimensional CAD system, and imposes a large operational load when entering a complicated plane shape.

SUMMARY OF THE INVENTION

According to the present invention, there is provided a three-dimensional computer aided design system which facilitates incorporation of a basic shape into a sketch screen forming the basis for three-dimensional modelling, and a method for such support.

Also according to the present invention, there is provided a three-dimensional computer aided design system which permits utilization of design assets through effective use of two-dimensional drawing data prepared in an existing two-dimensional computer aided design system for three-dimensional modelling, and a method for such support.

The three-dimensional computer aided design system has a two-dimensional data reference section, a two-dimensional data take-in section, and a three-dimensional conversion section. The two-dimensional data reference section refers to two-dimensional drawing data in a two-dimensional data storage section, and specifies two-dimensional drawing data containing the sketch fundamental plane shape to be used for three-dimensional modelling on the sketch screen for display. The two-dimensional data take-in section specifies a plane shape to be used in the sketch fundamental plane shape from among the two-dimensional drawing data displayed in response to the specification by the two-dimensional data reference section, and takes it in the sketch screen. The three-dimensional conversion section converts the two-dimensional data of the plane shape taken in the two-dimensional data take-in section into three-dimensional data to prepare three-dimensional data of the sketch fundamental plane shape. At this point, the two-dimensional data reference section reads out list information listing drawing titles from the two-dimensional data storage section and displays this information, thereby permitting specification of the necessary drawing titles.

The two-dimensional data take-in section specifies line elements of the displayed two-dimensional drawing data and takes the plane shape into the sketch screen. There may be a chain retrieval section which retrieves a chain of line elements of the two-dimensional graphic data to extract a graphic shape so as to take the plane shape retrieved by this chain retrieval section in response to the specification of a starting point of chain retrieval relative to the displayed two-dimensional drawing data into the sketch screen.

Furthermore, the two-dimensional data take-in section may specify an area for the displayed two-dimensional drawing data so as to take the plane shape contained in the thus specified area into the sketch screen. In addition, it is also possible to take the plane shape into the sketch display window on the same display screen by displaying the specified two-dimensional drawing data in the two-dimensional window on the display screen, and specifying the plane shape among the two-dimensional drawing data displayed in the two-dimensional window in the two-dimensional data take-in section.

Three-dimensional data of the sketch fundamental plane shape converted by the three-dimensional conversion section are stored in the three-dimensional data storage section.

The three-dimensional computer aided design method of the present invention comprises, on the other hand, the following processing steps:

A two-dimensional data referring step:

Referring to two-dimensional drawing data in the two-dimensional data storage section, and specifying and displaying two-dimensional drawing data containing the sketch fundamental plane shape used for three-dimensional modelling in the sketch screen;

A two-dimensional data take-in step:

Specifying the plane shapes to be used for the sketch fundamental plane shape from among the two-dimensional drawing data displayed in the two-dimensional data referring step; and A three-dimensional conversion step:

Converting the two-dimensional data of the plane shapes taken in during the two-dimensional data take-in step into three-dimensional data, thereby preparing three-dimensional data for the sketch fundamental plane shapes.

According to the three-dimensional computer aided design system and the method therefor of the present invention as described above, it is possible to perform design operations for three-dimensional modelling based on effective utilization of existing drawing data prepared by a two-dimensional computer aided design system as a form of accumulated information assets. This is achieved by specifying and using two-dimensional drawing data containing the sketch fundamental plane shapes used for three-dimensional modelling, from among existing two-dimensional drawing data.

Since it is possible to automatically take in necessary shapes through specification by a mouse, for example, from among the two-dimensional drawing data displayed in units of drawing, as sketch fundamental plane shapes on the sketch screen, it is easy to take in shapes from two-dimensional drawing data, almost without the necessity for deletion or other editing operations after take in. It is further possible to improve efficiency of input operations of sketch fundamental plane shapes necessary as preparatory operations for three-dimensional modelling, and to largely reduce the burden imposed on the design operations.

Even when the object has a complicated shape, use of past assets permits elimination of the necessity for manual input operations and smooth shift to three-dimensional modelling in the original sense of the words.

The above and other objects, features, and advantages of the present invention will become more apparent from the following detailed description with reference to the drawings.

BRIEF DESCRIPTION OF THE DRAWINGS

FIG. 7 is a descriptive view of a sketch screen of a first embodiment in which a sketch fundamental plane shape is taken in;

FIG. 8 is a descriptive view of a sketch screen of a second embodiment in which a sketch fundamental plane shape is taken in;

FIG. 9 is a descriptive view of a sketch screen of a third embodiment in which a sketch fundamental plane shape is taken in;

FIG. 10 is a descriptive view of a sketch screen of a fourth embodiment in which a sketch fundamental plane shape is taken in;

FIGS. 12A and 12B are structural descriptive views of two-dimensional and three-dimensional data;

FIGS. 13A and 13B are descriptive views of detailed examples of two-dimensional and three-dimensional data;

DETAILED DESCRIPTION OF THE PREFERRED EMBODIMENTS

Figure 1:
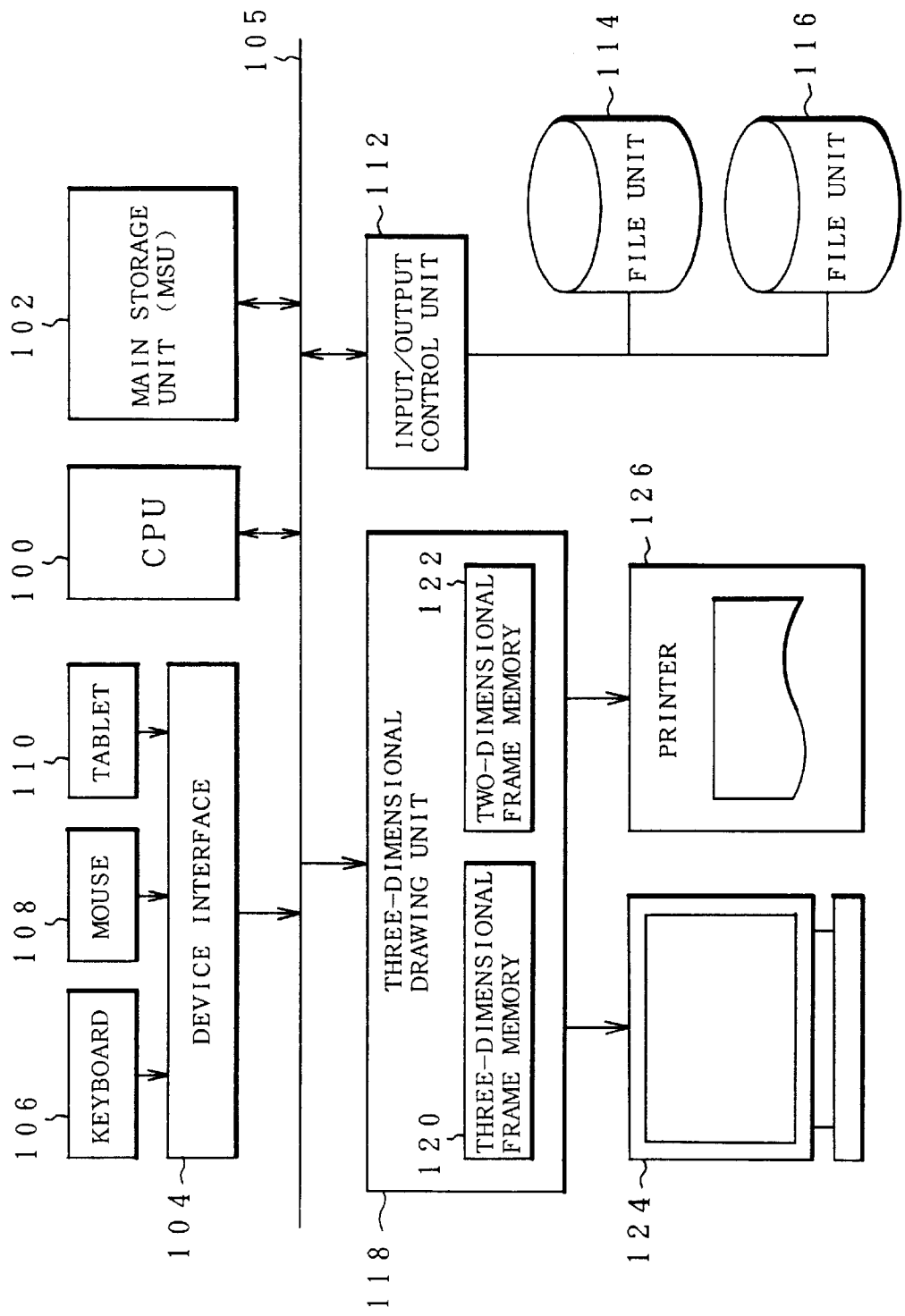
FIG. 1 is a block diagram of the hardware configuration of the present invention.

In FIG. 1, CPU 100 performs various processing operations necessary for such support as design, expression, manipulation, display and analysis of a three-dimensional object. A main storage unit 102 is connected via a bus 105 to CPU 100, in which various processing programs, data and work areas are provided. A keyboard 106, a mouse 108 and a tablet 1 are connected as input units via a device interface 104 to CPU 100. As external storage units of CPU 100, file units 114 and 116 are connected via an input/output unit 112. As the file units 114 and 116, appropriate external storage units such as magnetic disk units are used. In the present invention, the file unit 114 is used as a storage section of two-dimensional drawing data, and the file unit 116 is used as a storage section of three-dimensional drawing data.

A three-dimensional drawing unit 118 serving as a graphic accelerator is provided for CPU 100. The three-dimensional drawing unit 118 receives coordinate data from CPU 100, and develops graphic data of a three-dimensional object in the form of bit map data basically in a three-dimensional frame memory 120 through prescribed geometric processing and rendering processing A two-dimensional frame memory 122 is provided in the three-dimensional drawing unit 118, and generates and stores two-dimensional data as projected data of three-dimensional data of the three-dimensional frame memory 120. As an output section for the three-dimensional drawing unit 118, a color display unit 124 and a printer unit 126 are provided.

Figure 2:
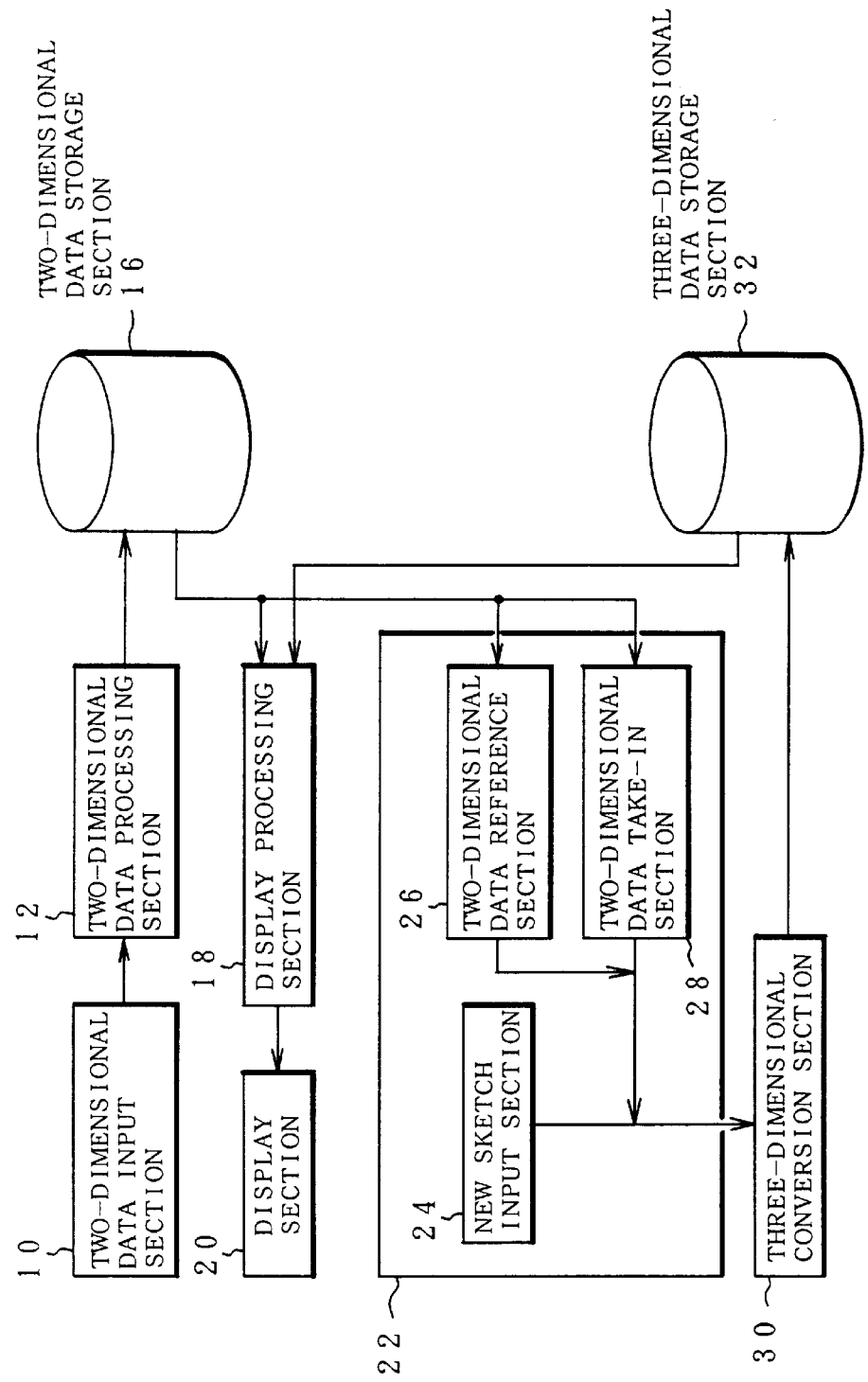
FIG. 2 is a block diagram of the functions of the present invention.

FIG. 2 shows the sketch screen input function using two-dimensional drawing data in the three-dimensional computer aided design system of the present invention. First, functions of a two-dimensional computer aided design system are achieved by a two-dimensional data input section 10, a two-dimensional data processing section 12 and a two-dimensional data storage section 16. These sections together provide the same functions as those provided by an existing two-dimensional computer aided design system. For this purpose, already prepared two-dimensional drawing data are accumulated in the two-dimensional data storage section 16. This accumulation of data in the two-dimensional data storage section 16 may be accomplished by storing two-dimensional drawing data already prepared by a separate two-dimensional computer aided design system without any further processing.

For the purpose of achieving sketch screen input function of the three-dimensional computer aided design system, on the other hand, a display processing section 18, a display section 20, a sketch input section 22, a three-dimensional conversion section 30 and a three-dimensional data storage section 32 are provided. The sketch input section 22 is provided with a new sketch input section 24, a two-dimensional data reference section 26 and a two-dimensional data take-in section 28. The sketch input section 22 performs input processing of sketch fundamental plane shapes forming the basis for three-dimensional modelling on the sketch screen of the display section 20 as a preparatory operation for three-dimensional modelling. Inputs of sketch fundamental plane shapes are divided into new inputs entered by the use of the new sketch input section 24 and those entered using two dimensional drawing data of the two-dimensional data storage section 16 stored by the two-dimensional data reference section 26 and the two-dimensional data take-in section 28. The sketch input conducted by the new sketch input section 24 is an input processing in which nothing is displayed on the sketch screen of the display section 20, but the operator draws the sketch fundamental plane shapes by the various input devices shown in FIG. 1 from the start. The sketch input processing using the two-dimensional data reference section 26 and the two-dimensional data take-in section 28 is in contrast, an input of the sketch fundamental plane shapes by the utilization of two-dimensional drawing data stored in the two-dimensional data storage section 16.

The two-dimensional data reference section 26 fetches out the control file name list showing titles of the two-dimensional drawing data stored in the two-dimensional data storage section 16, and displays the list on the display section 20. The operator watches the name list on the display section 20, and specifies the titles of the necessary drawings. In response to this specification, the two-dimensional data reference section 26 reads out two-dimensional data corresponding to the specified titles of drawings from the two-dimensional data storage section 16, and displays the graphic data on the two-dimensional display screen of the display section 20.

The two-dimensional data take-in section 28 switches over the display screen of the display section 20 displayed by the two-dimensional data reference section 26 into a sketch screen, and displays two-dimensional graphic data on the thus switched sketch screen to cause operator's selection and specification of sketch fundamental plane shapes to be executed. When the operator specifies necessary plane shapes from among the graphic data on the sketch screen, two-dimensional data of the specified plane shapes are taken in and supplied to the three-dimensional conversion section 30. The three-dimensional conversion section 30 converts the two-dimensional drawing plane shape data taken in by the two-dimensional data take-in section 28 into three-dimensional data format, and stores the thus converted data as the entered sketch fundamental plane shape in the three-dimensional data storage section 32. When three-dimensional data of the sketch fundamental plane shapes to be used for three-dimensional modelling are prepared in the three-dimensional data storage section 32, the sketch fundamental plane shapes entered by the sketch input section 22 are displayed on the sketch screen of the display section 20 by the use of the three-dimensional drawing function, and on the basis of these sketch fundamental plane shapes, design processing of three-dimensional modelling which constructs a three-dimensional object through working out of details and other modelling operations.

Figure 3:
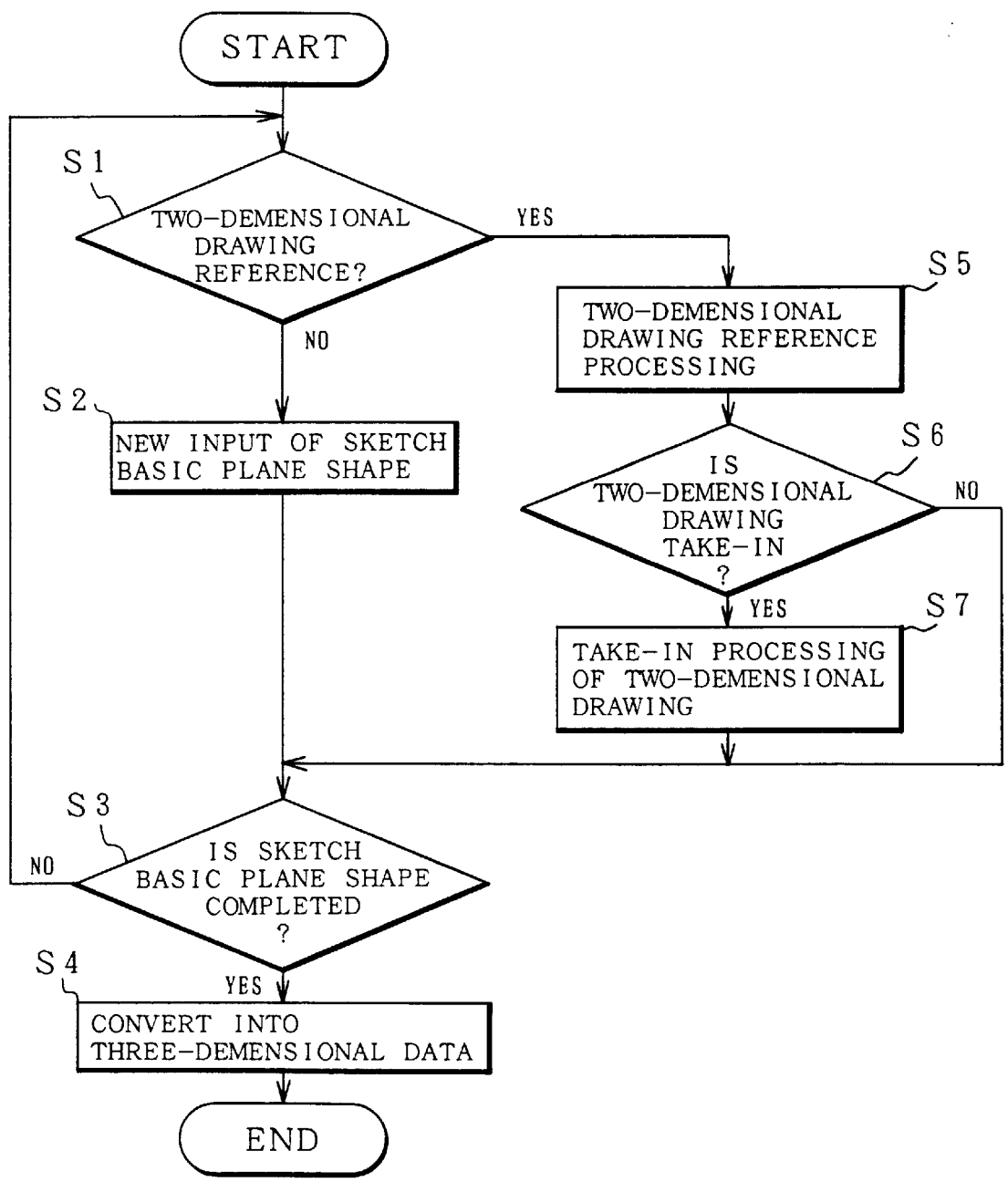
FIG. 3 is a flow chart of sketch input processing of the present invention.

The flow chart shown in FIG. 3 covers the sketch input processing shown in FIG. 2. First, at step S1, it is determined whether or not to refer to the two-dimensional drawings, upon sketch input. When making a new input without referring to the two-dimensional drawings, processing proceeds to step S2, at which a new input of sketch fundamental plane shapes is conducted, i.e., the operator enters two-dimensional plane shapes forming the basis for three-dimensional modelling while squeezing out drawings and concepts. New input at step S2 is repeated until the completion of sketch fundamental plane shapes is determined at step S3. Upon completion of the sketch fundamental plane shapes, processing goes to step S4, in which data are converted into three-dimensional data and stored, for example, in the three-dimensional data storage section 32. When reference to a two-dimensional drawing is determined at step S1, the process advances to step S5 to perform two-dimensional drawing reference processing. First, the drawing title list is read out from the control file stored in the two-dimensional data storage section 16 and displayed. By specifying a drawing title necessary for the preparation of a sketch fundamental plane shape from among the displayed drawing titles, the specified two-dimensional graphic data are displayed on the display section 20. Then at step S6, take-in or not of the displayed two-dimensional drawing data as a sketch fundamental plane shape is determined. If take-in is determined, the processing goes to step S7 to conduct a two-dimensional drawing take-in processing. More specifically, data serving as basic data of the sketch fundamental plane shape for three-dimensional modelling are taken in from among the displayed two dimensional drawings. After the completion of take-in at step S7, completion or not of the sketch fundamental plane shape is determined at step S3, and the steps S5 to S7 are repeated until the shape is completed. Finally at step S4, data are converted into three-dimensional data which are stored in the three-dimensional data storage section 32. The sketch input processing at steps S1 to S7 may be input processing of sketch fundamental plane shapes for a single design object, or may be input processing of sketch fundamental plane shapes for many design objects such as those for the preparation of parts.

Figure 4:
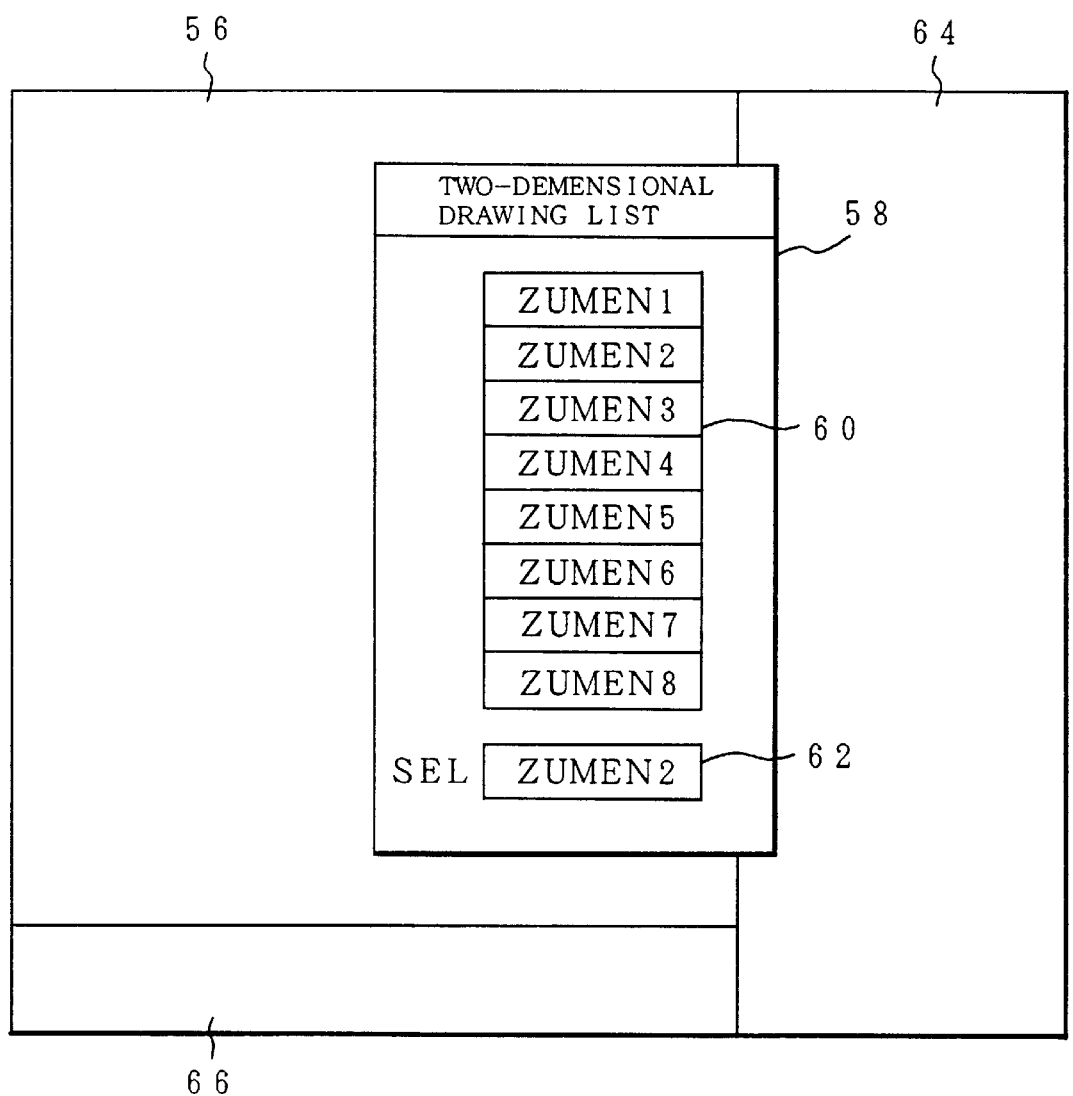
FIG. 4 is a descriptive view of a reference screen of a two-dimensional drawing.

FIG. 4 is a two-dimensional drawing reference screen used in a processing of the two-dimensional data reference section 26 provided in the sketch input section 22 shown in FIG. 2. A two-dimensional display screen 56 for displaying two-dimensional drawing data is provided on the display, and upon an operator's specification of reference processing of a two-dimensional drawing, a list window 58 for two-dimensional drawings is displayed on the two-dimensional display screen 56. In the two-dimensional drawing list window 58, a list 60 showing the titles of the two-dimensional drawing data currently stored in the two-dimensional data storage section 16 is displayed. When all the drawing titles cannot be displayed in the list 60, scrolling display of drawing titles can be made by the operation of the mouse, for example. By viewing the list 60 of the drawing titles, the operator selects drawing titles associated with the object to be designed by a mouse click. FIG. 4 represents a case where "ZUMEN2" listed second in the drawing title list 60 is specified by a mouse click. In response to this specification, the selected drawing title "ZUMEN2" is displayed, together with the menu "SEL," in the selection menu box 62 at the bottom of the screen. After confirming his selection shown in the selection menu box 62, the operator mouse-clicks at the menu display of "SEL," then, the two-dimensional drawing data corresponding to the specified drawing title are read out from the two-dimensional data storage section 16, and displayed on the two-dimensional display screen 56.

Figure 5:
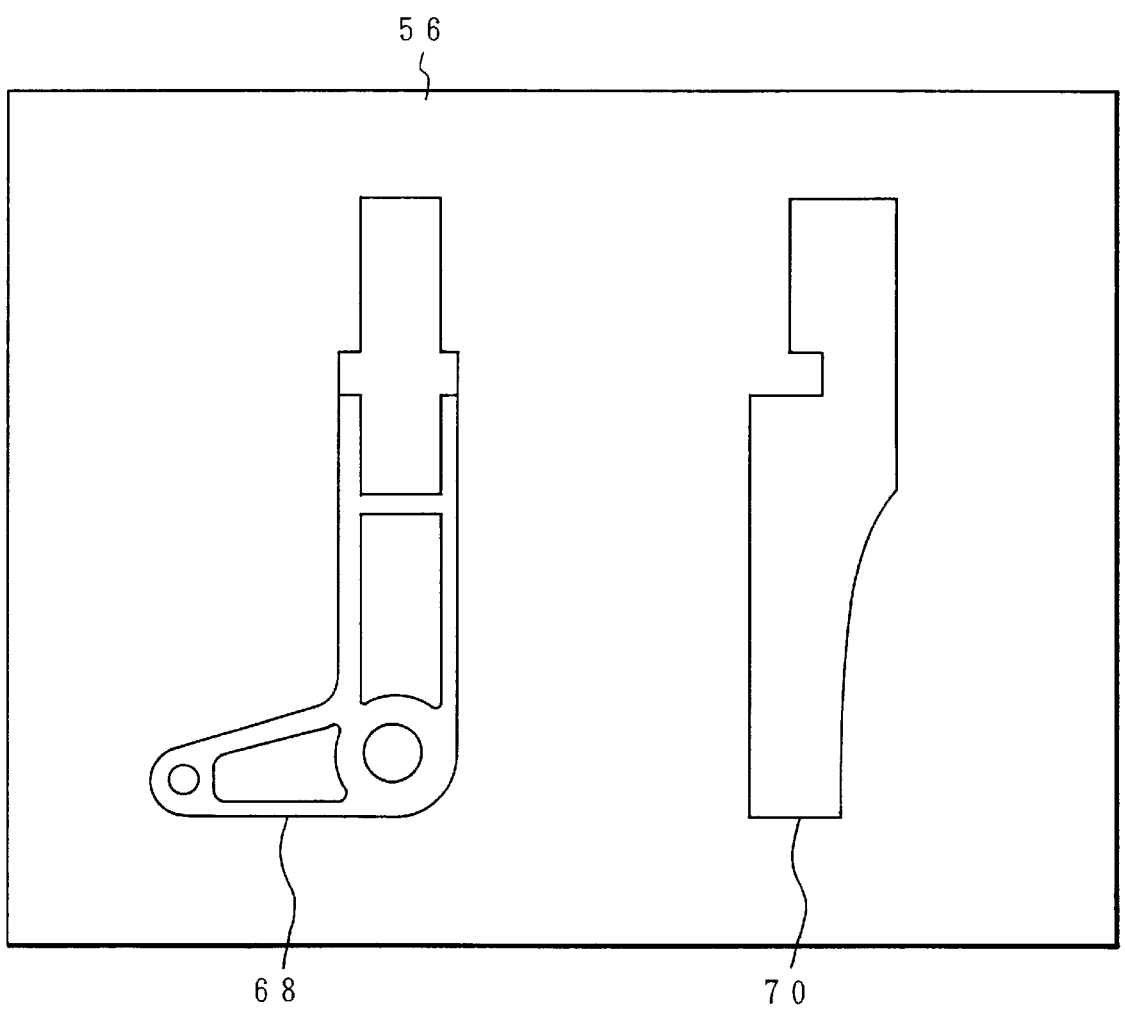
FIG. 5 is a descriptive view of a two-dimensional drawing display screen obtained through a reference processing.

FIG. 5 shows an example of two-dimensional drawing data displayed on the two-dimensional display screen 56 in response to the specification of the drawing title as shown in FIG. 4. In this case, a front view graphic 68 and a side view graphic 70 of the design object selected by the operator are displayed on the two-dimensional display screen 56.

Figure 6:
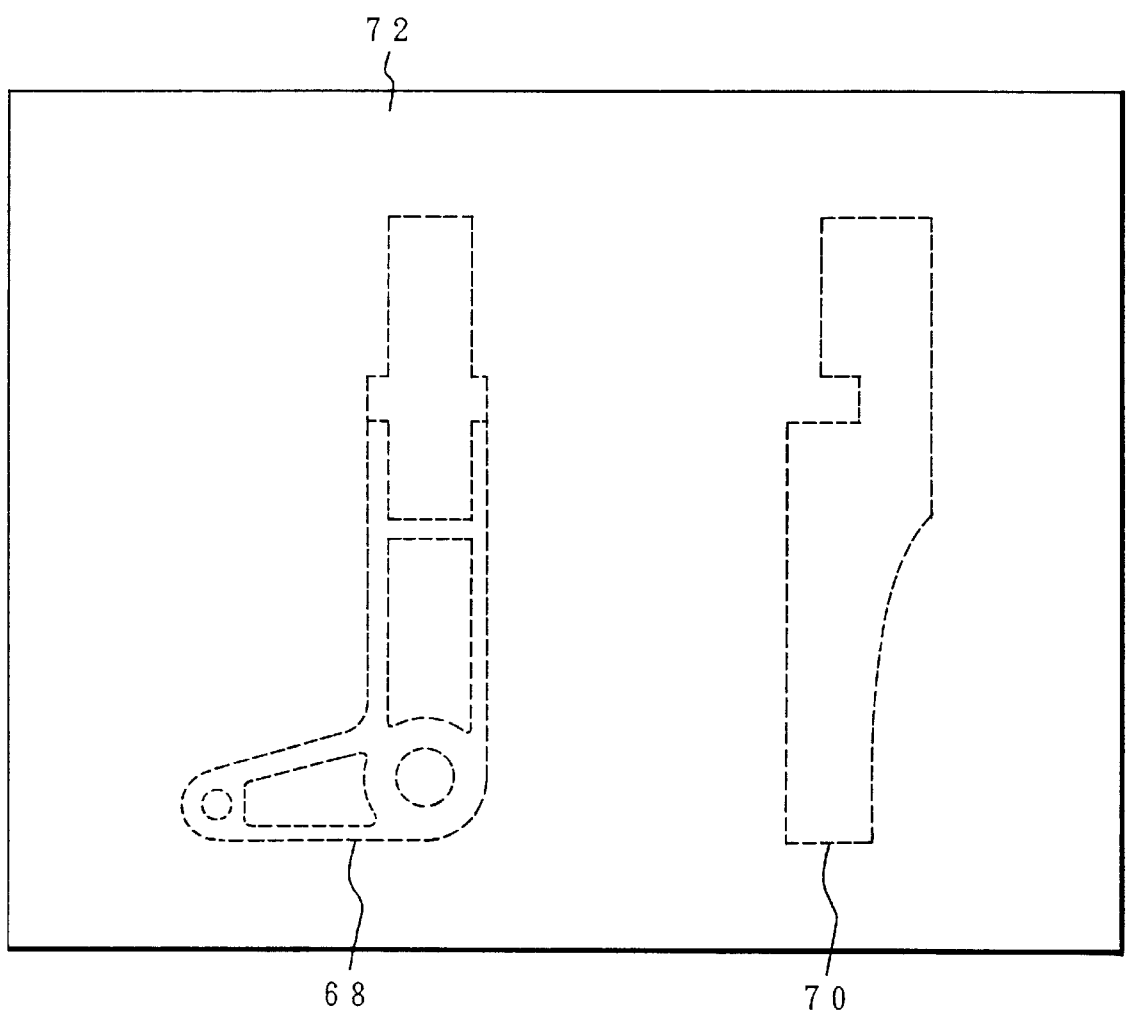
FIG. 6 is a descriptive view of a sketch screen displaying a two-dimensional drawing.

FIG. 6 shows a state in which the screen has been switched over to a three-dimensional sketch screen 72 at the two-dimensional data take-in section 28 as shown in FIG. 2 and in the two-dimensional drawing data take-in processing at step S7 as shown in FIG. 3, following display in the reference processing of two-dimensional drawing data as shown in FIG. 5. In this screen switchover, the front view graphic 68 and the side view graphic 70 of the object as displayed on the two-dimensional display screen 56 as shown in FIG. 5 are directly displayed on the three-dimensional sketch screen 72. Since take-in of sketch fundamental plane shape on the three-dimensional sketch screen 72 has not as yet completed at this stage, the front view graphic 68 and the side view graphic 70 of the object are displayed in colors different from the display color after specification. In the drawing, a graphic before take-in is displayed by dotted lines, and a graphic after take-in is shown by slid lines.

Figure 7:
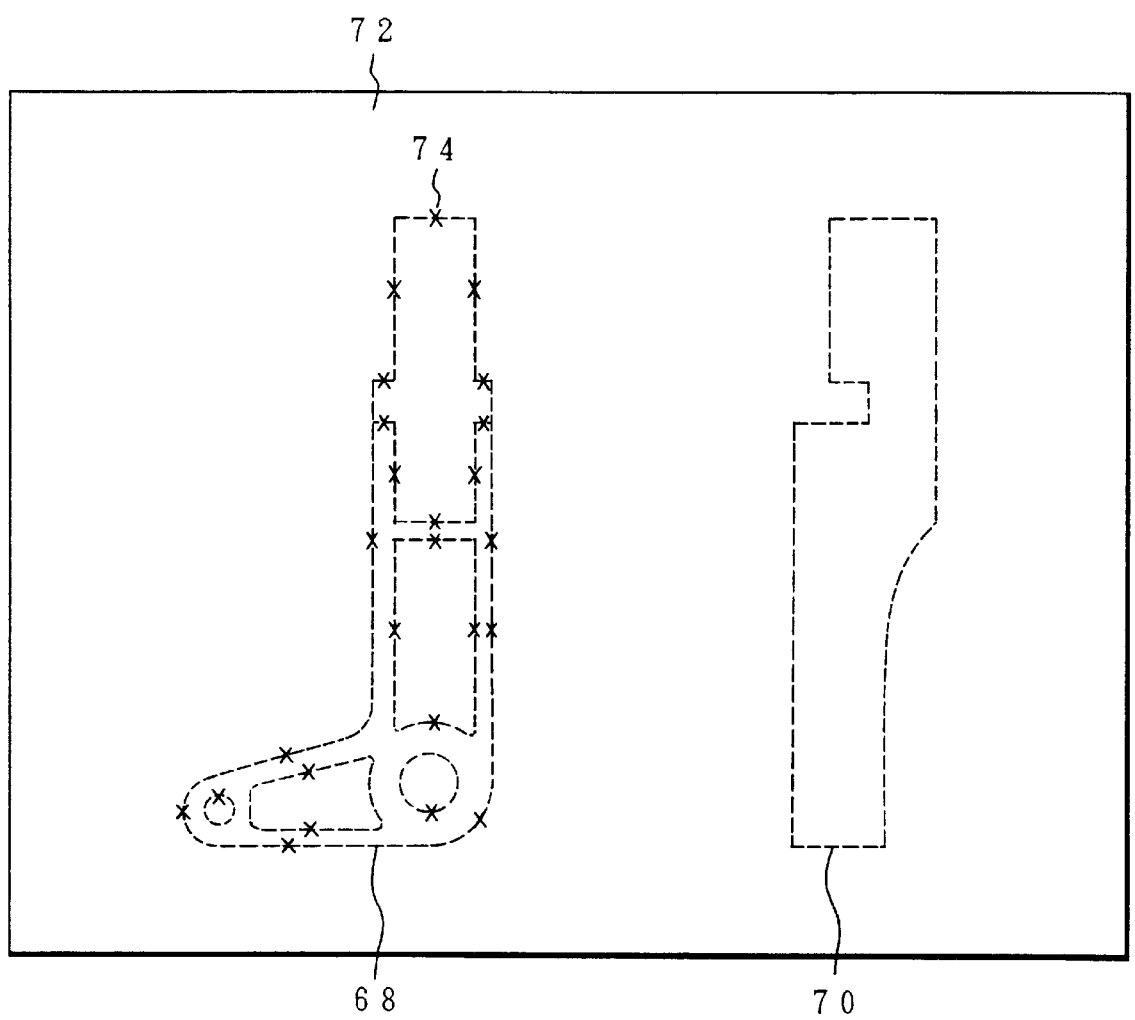

FIG. 7 is a first embodiment of specification processing for taking in sketch fundamental plane shapes, using the front view graphic 68 and the side view graphic 70 of the object as two-dimensional data displayed on the three-dimensional sketch screen 72. In this embodiment, individual segments are mouse-clicked as shown by mark x 74, with a view to taking in, for example, the front view graphic 68 of the object with no processing as a sketch fundamental plane shape to be used in three-dimensional modelling. It is needless to mention that only the segments for the outer profile can be mouse-clicked to take in part of the graphic shape, without mouse-clicking all the segments.

Figure 8:
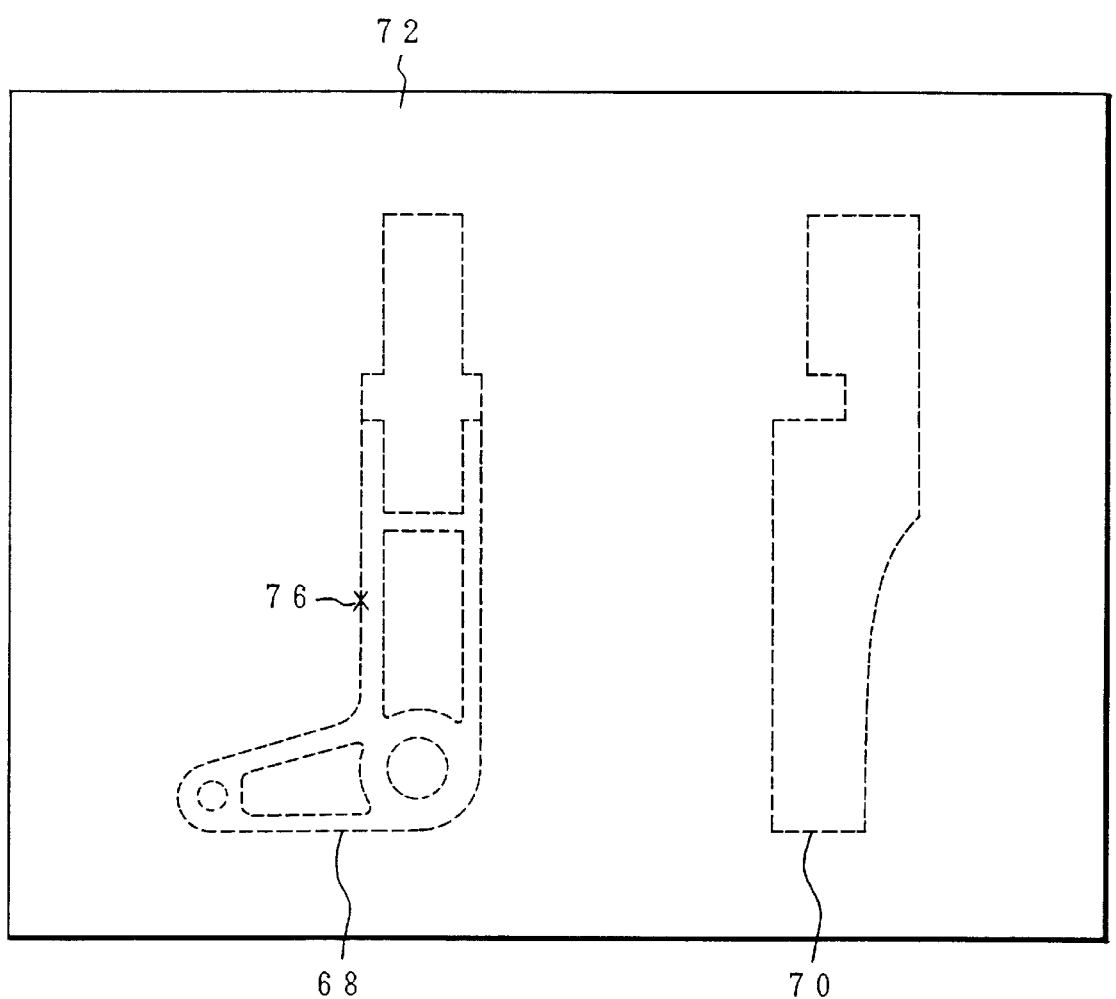

FIG. 8 shows a second embodiment of the take-in processing of sketch fundamental plane shapes. In the second embodiment, the two-dimensional data take-in section 28 is provided with the chain retrieval function of segments, and sketch fundamental plane shapes are taken in by the use of this chain retrieval function. In the chain retrieval function, when taking in the displayed front view graphic 68, for example, specification of an arbitrary segment by mouse-click 76 causes automatic followup of the chain of segments to start with this specified point 76 as the starting point of retrieval and to return to the starting point 76 again. Data made available by the retrieval form a group of taken-in data. In this chain retrieval, inner segments separate from the starting point 76 cannot be retrieved. However, by specifying a mode in which all the segments located in the inside are automatically retrieved and all the segments contained in the outer frame determined by chain retrieval are taken in, all two-dimensional drawing data including all the segments can be taken in through chain retrieval of the outer profile. It is of course possible to conduct take-in by chain retrieval by making mouse-click 70 specification for each segment forming a closed loop.

Figure 9:
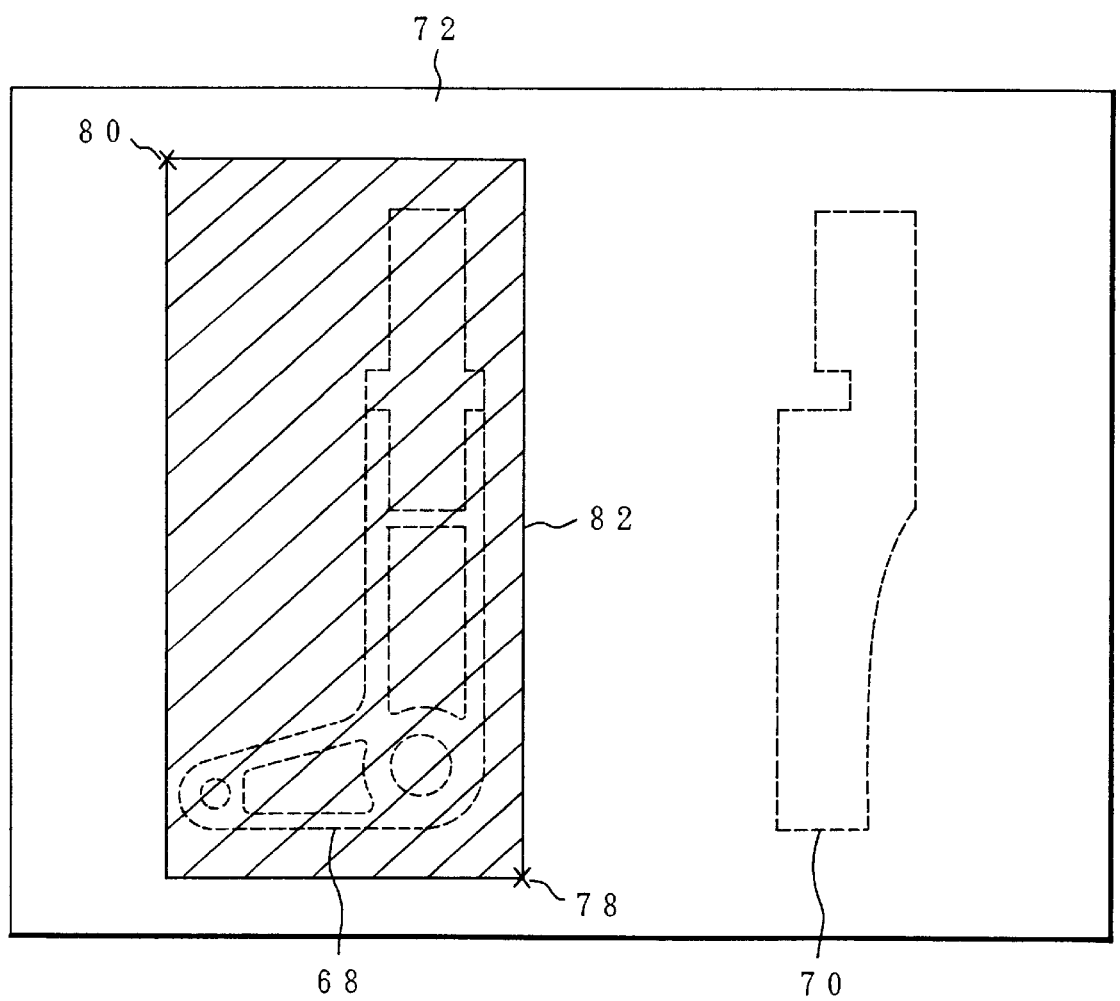

FIG. 9 is a third embodiment of take-in processing of sketch fundamental plane shapes. This embodiment is characterized in that two-dimensional drawing data are taken in through specification of area. In the case of FIG. 9, because the displayed front view graphic 82 of the design object is taken in as a sketch fundamental plane shape, specification of two vertices in the diagonal direction of a rectangular area by mouse-clicks 78 and 80 results in specification of an area shown as a shadowed portion 82, and drawing data of the front view graphic 68 of the object contained in this area 82 are taken in.

Figure 10:
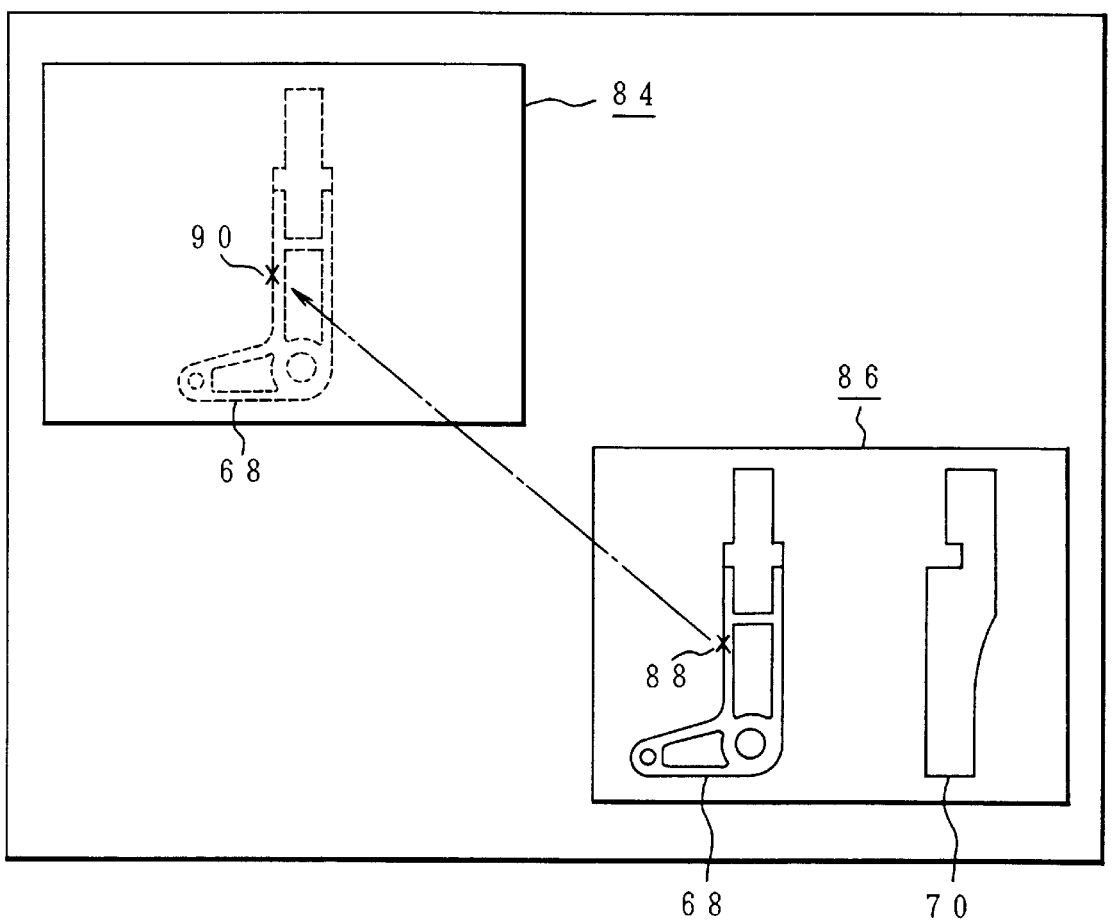

FIG. 10 is a fourth embodiment of take-in processing of sketch fundamental plane shapes. The fourth embodiment is characterized in that a two-dimensional window 86 and a three-dimensional sketch window 84 are displayed on the display screen, and sketch fundamental plane shapes are taken in by the utilization of dragging of graphics between windows. A front view graphic 68 and a side view graphic 70 of the design object are displayed in the two-dimensional window 86 of the display screen as two-dimensional drawing data read out from the two-dimensional data storage section 16 through reference processing of the two-dimensional data reference section 26. When the front view graphic 68 of the object in this two-dimensional window 86 is to be taken into the three-dimensional sketch window 84 as a sketch fundamental plane shape, a mouse-click is made against the front view graphic 68 of the object. Then, by making another mouse-click 90 against the three-dimensional sketch window 84, the front view graphic 68 of the object is taken into the three-dimensional sketch window 84 in a different color (represented by dotted lines). Upon completion of take-in into the three-dimensional sketch window 84, erase of the two-dimensional window switches over the entire screen into a sketch display.

Figure 11:
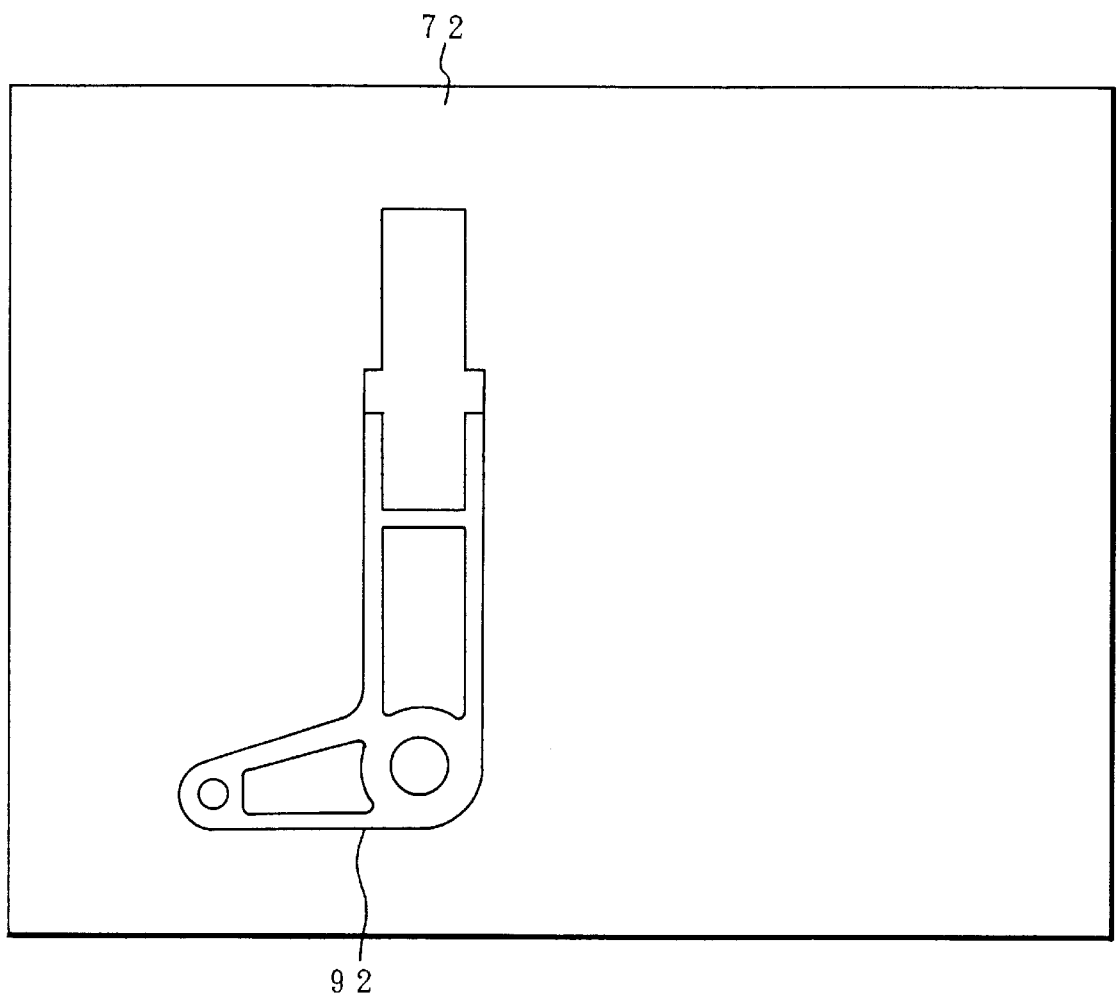
FIG. 11 is a descriptive view of a sketch screen in a state in which take-in of sketch fundamental plane shapes has been completed.

FIG. 11 is a sketch fundamental plane shape 92 taken into the three-dimensional sketch screen 72 in any of the embodiments shown in FIGS. 7 to 10. Take-in of a sketch fundamental plane shape into the three-dimensional sketch screen by two-dimensional drawing data stored in the two-dimensional data storage section 16 can be accomplished only by simple operations comprising the selection of necessary two-dimensional drawings and specification of plane shapes in the drawings displayed by the selection, and as compared with the practice of sketch-entering the same plane shapes from the very beginning by the new sketch input section 24, input operation can be performed at a far higher efficiency, and the load on the operator can be minimized.

As shown in FIG. 11, a fundamental plane shape 92 taken into the three-dimensional sketch screen 72 may be used with no further processing, or may be completed as a sketch fundamental plane shape after an appropriate processing as required. Since the basic shape has been obtained from two-dimensional drawing data at all events, operations are efficient with a smaller load on the operator. Upon completion of the sketch fundamental plane shape 92 on the three-dimensional sketch screen 72 as shown in FIG. 11, the two-dimensional data of the completed sketch fundamental plane shape are converted into three-dimensional data by the three-dimensional conversion section 30 shown in FIG. 2 and the conversion processing into three-dimensional data shown at step S4 in FIG. 3.

FIGS. 12A and 12B compare two-dimensional and three-dimensional data in terms of coordinate data used in the present invention. FIG. 12A shows two-dimensional data, which have an x-coordinate value 36 and a y-coordinate value 38 following an index 34, and are provided with RGB data 40 serving as color information for the coordinate points. In addition, control parameters 42 can be set by the use of a free area as required. Control parameters include, for example, a starting point information and an end point information. FIG. 12B shows on the other hand three-dimensional data, which have an x-coordinate value 46, a y-coordinate value 48 and a z-coordinate value 50 following an index 44, and furthermore provided with RGB data 52 and control parameters 54. Conversion of two-dimensional data into three-dimensional data in the present invention therefore means conversion of the data format shown in FIG. 12A into the data format shown in FIG. 12B.

FIGS. 13A and 13B show concrete examples of coordinate conversion from the two-dimensional coordinate data into three-dimensional coordinate data in the three-dimensional sketch screen 72. The two-dimensional data shown in FIG. 13A have an x-coordinate value 36 of "2.0," and a y-coordinate value "3.0" following an index 34. When converting the two-dimensional data into three-dimensional data, the x-coordinate value 46 of "2.0" and the y-coordinate value 48 of "3.0" remaining the same, a newly added z-coordinate value 50 takes a value of "0.0." In other words, at the stage of conversion of the two-dimensional data into three-dimensional data with no further processing, the z-coordinate value 50 has not originally exist, it suffices to assign an initial value of "0.0" to z-coordinate value.

Coordinate point data in FIGS. 12A, 12B, 13A and 13B constitute data for a single segment by coordinate point data representing a starting point and coordinate point data representing an end point. For a circle, a circle data structure is available by specifying a center coordinate point and a radius, as well as a circular formula specified by an index representing the circular shape. A data structure of any other curve may of course be obtained with an arbitrary coordinate point on the curve and index information of a formula representing the curve.

Figure 14:
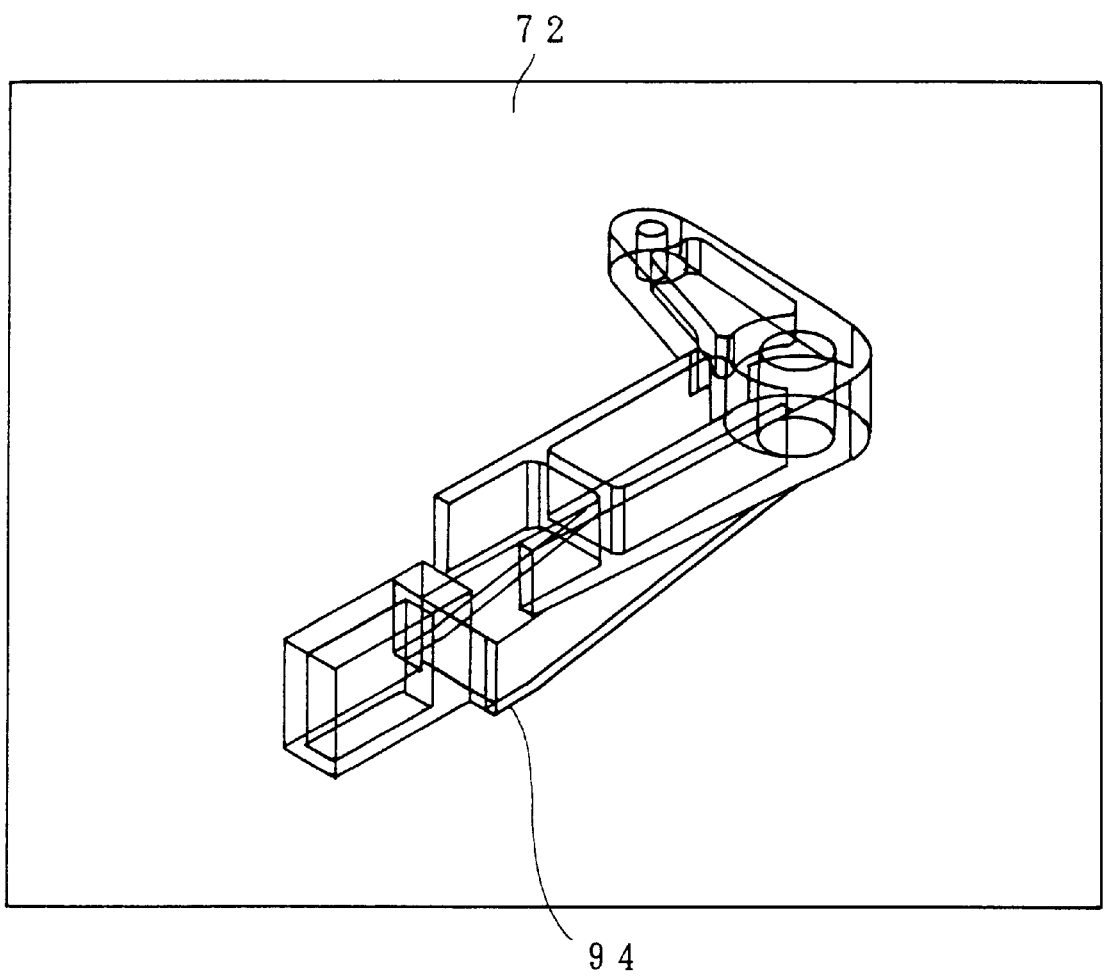
FIG. 14 is a descriptive view of a three dimensional image prepared by means of sketch-entered fundamental plane shapes.

FIG. 14 is a three-dimensional modelling image 94 prepared through three-dimensional modelling, using, as basic data, three-dimensional sketch fundamental plane shapes stored in the three-dimensional data storage section 32, as prepared through the sketch input steps as described above. This three-dimensional modelling image 94 was prepared by the effective utilization of the drawing function of the three-dimensional computer aided design system by the operator, on the basis of three-dimensional data of the sketch fundamental plane shape 92 completed as shown in FIG. 11, including the basic shapes of the existing two-dimensional drawing data as basic information of modelling.

Figure 15:
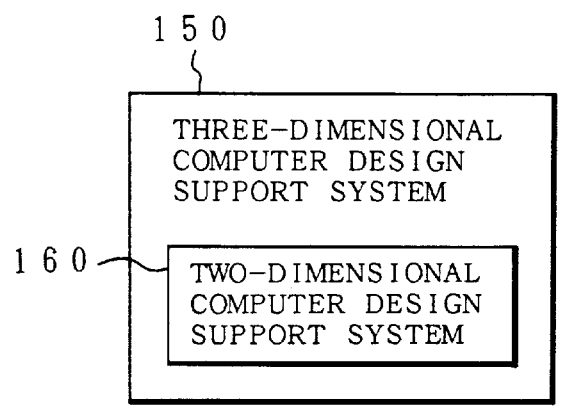
FIG. 15 is a block diagram showing a form of equipment configuration of the system of the present invention.

FIG. 15 shows the basic form of equipment configuration of the system of the present invention conducting sketch input by the use of two-dimensional graphic data of a two-dimensional computer aided design system: this corresponds to the functional block shown in FIG. 2 and has a built-in two-dimensional computer aided design system as a function of the three-dimensional computer aided design system.

Figure 16:
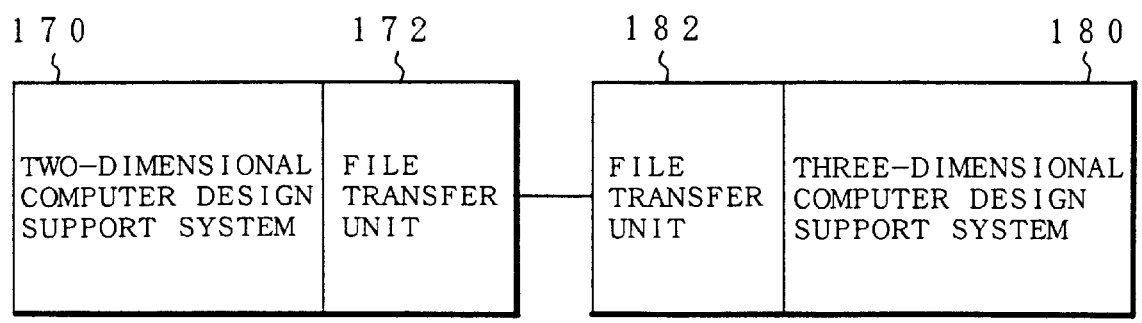
FIG. 16 is a block diagram showing another form of equipment configuration of the system of the present invention.

FIG. 16 shows another form of equipment configuration of the present invention in which sketch input is accomplished by the use of two-dimensional graphic data of a two-dimensional computer aided design system: a two-dimensional computer aided design system 170 and a three-dimensional computer aided design system 180 are separately present. In this configuration, a file transfer unit 172 is provided in the two-dimensional computer aided design system 170, and a file transfer unit 182 is provided also in the three-dimensional computer aided design system 180. The both units are connected with a cable, so that, upon request from the three-dimensional computer aided design system 180, two-dimensional drawing data stored in the files of the two-dimensional computer aided design system 170 are transferred and can be utilized for sketch-input. It is needless to mention that two-dimensional design data of the two-dimensional computer aided design system may be provided through such media as a magnetic tape or an optical disk cartridge to the three-dimensional computer aided design system 180 without relying upon an online configuration.

According to the present invention, as described above, it is possible to prepare sketch fundamental plane shapes forming the basis for modelling by the use of existing drawing data, to largely alleviate operational load on the operator as compared with the new input technique, and thus to perform efficient input processing of sketch fundamental plane shapes. Since sketch fundamental plane shapes are entered by the utilization of existing two-dimensional drawing data, it is possible to effectively utilize two-dimensional drawing data obtained in the past from computer aided design as information assets, and to build an effective form of use of past design assets. Furthermore, when transferring from an existing two-dimensional computer aided design system to a sophisticated three-dimensional computer aided design system, design assets accumulated in the past are never useless, thus permitting smooth shift to a three-dimensional computer aided design system.

What is claimed is:

1. A computer system supporting a design operation of a three-dimensional object, comprising:

a two-dimensional data storage section to store a plurality of existing two-dimensional drawing data;

a two-dimensional data reference section which refers to said plurality of existing two-dimensional drawing data stored in said two-dimensional data storage section, and which specifies one of said plurality of existing two-dimensional drawing data, said specified one two-dimensional drawing data including a plurality of plane shapes;

a display processing section to display said specified one two-dimensional drawing data on a sketch screen;

a two-dimensional data take-in section which selects at least a portion of said displayed one two-dimensional drawing data by specifying at least one of said plurality of plane shapes in said specified one two-dimensional drawing data displayed on said sketch screen, and which automatically inputs said specified at least one plane shape; and a three-dimensional conversion section converting for each of the specified at least one of said plurality of plane shapes two-dimensional drawing data to a data structure of three-dimensional data based on the two-dimensional drawing data of said specified at least one plane shape automatically inputted by said two-dimensional data take-in section, said two-dimensional drawing data including an x-coordinates value, a y-coordinates value, and control parameters including a starting point and an ending point, and said three-dimensional data including the x-coordinates value, the y-coordinates value, a z-coordinates value, and the control parameters, said z-coordinates value being set to an initial value.

2. A system according to claim 1, wherein:

said two-dimensional data reference section reads out list information showing a list of drawing titles from said two-dimensional data storage section and displays said list information to enable an operator to specify one of said drawing titles from said displayed list information.

3. A system according to claim 1, wherein:

said two-dimensional data take-in section specifies line elements of the displayed two-dimensional drawing data and automatically inputs the at least one plane shapes into the sketch screen.

4. A system according to claim 1, wherein:

said two-dimensional data take-in section includes a chain retrieval section which retrieves a chain of line elements of the displayed two-dimensional drawing data to extract graphic shapes, and automatically inputs the at least one plane shapes retrieved by said chain retrieval section on the basis of the specification of a starting point of chain retrieval relative to the displayed two-dimensional drawing data.

5. A system according to claim 1, wherein:

said two-dimensional data take-in section specifies an area of said sketch screen which displays said two-dimensional drawing data, and automatically inputs said at least one plane shapes included in said specified area into the sketch screen.

6. A system according to claim 1, wherein:

said two-dimensional data reference section displays the specified two-dimensional drawing data in a two-dimensional window on a display screen; and said two-dimensional data take-in section specifies the at least one plane shapes in the two-dimensional drawing data displayed in said two-dimensional window, and automatically inputs said at least one plane shapes into the sketch screen converted from the display screen.

7. A system according to claim 1, wherein:

said three-dimensional generation section stores the generated three-dimensional data of sketch fundamental plane shapes in a three-dimensional data storage section.

8. A method of supporting a design operation of a three-dimensional object by a computer, comprising:

a two-dimensional data reference step for referring to a plurality of existing two-dimensional drawing data stored in a two-dimensional data storage section and for specifying one of said plurality of existing two-dimensional drawing data, said specified one two-dimensional drawing data including a plurality of plane shapes;

a display step of displaying said specified one two-dimensional drawing data on a sketch screen;

a two-dimensional data take-in step of selecting at least a portion of said displayed one two-dimensional drawing data by specifying at least one of said plurality of plane shapes in said specified one two-dimensional drawing data displayed by said display step on said sketch screen and of automatically inputting said specified at least one plane shape; and a three-dimensional conversion step converting for each of the specified at least one of said plurality of plane shapes two-dimensional drawing data to a data structure of three-dimensional data based on the two-dimensional drawing data of said specified at least one plane shape automatically inputted by said two-dimensional data take in step, said two-dimensional drawing data including an x-coordinates value, a y-coordinates value, and control parameters including a starting point and an ending point, and said data structure of said three-dimensional data including the x-coordinates value, the y-coordinates value a z-coordinates value, and the control parameters, said z-coordinates value being set to an initial value.

9. A method according to claim 8, wherein:

said two-dimensional data reference step includes the steps of displaying list information showing a list of drawing titles from said two-dimensional data storage section, and specifying one of said drawing titles for display from said displayed list information.

10. A method according to claim 8, wherein:

said two-dimensional data take-in step includes the steps of specifying line elements of the displayed two-dimensional drawing data and automatically inputting the at least one plane shapes into the sketch screen.

11. A method according to claim 8, wherein:

said two-dimensional data take-in step includes the step of automatically inputting into the sketch screen said at least one plane shapes determined from said two-dimensional drawing data through a chain retrieval of continuous line elements.

12. A method according to claim 8, wherein:

said two-dimensional data take-in step includes the steps of specifying an area of said sketch screen which displays said two-dimensional drawing data and automatically inputting said at least one plane shapes included in said specified area into the sketch screen.

13. A method according to claim 8, wherein:

said two-dimensional data reference step includes the step of displaying the specified two-dimensional drawing data in a two-dimensional window on a display screen; and said two-dimensional data take-in step includes the step of specifying the at least one plane shapes in the two-dimensional drawing data displayed in said two-dimensional window, and automatically inputting said at least one plane shapes into the sketch screen converted from the display screen.

14. A method according to claim 8, wherein:

said three-dimensional generation step includes the step of storing the converted three-dimensional data of the sketch fundamental plane shapes in a three-dimensional data storage section.

* * * * *